United States Patent
Burza

(10) Patent No.: US 10,250,448 B2
(45) Date of Patent: Apr. 2, 2019

(54) METHOD OF COMMUNICATING INFORMATION BETWEEN NODES

(71) Applicant: KONINKLIJKE PHILIPS N.V., Eindhoven (NL)

(72) Inventor: Marek Brzysztof Burza, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/405,636

(22) PCT Filed: Jun. 3, 2013

(86) PCT No.: PCT/IB2013/054553
§ 371 (c)(1),
(2) Date: Dec. 4, 2014

(87) PCT Pub. No.: WO2013/190415
PCT Pub. Date: Dec. 27, 2013

(65) Prior Publication Data
US 2015/0139027 A1  May 21, 2015

Related U.S. Application Data

(60) Provisional application No. 61/662,950, filed on Jun. 22, 2012.

(51) Int. Cl.
*H04L 12/24* (2006.01)
*G08B 25/01* (2006.01)
*H04W 8/00* (2009.01)
*H04L 12/28* (2006.01)

(52) U.S. Cl.
CPC .......... *H04L 41/12* (2013.01); *G08B 25/016* (2013.01); *H04W 8/005* (2013.01)

(58) Field of Classification Search
CPC ....... H04L 41/12; H04W 8/005; G08B 25/016
USPC ........................................................ 370/254
See application file for complete search history.

(56) References Cited

U.S. PATENT DOCUMENTS

| | | | |
|---|---|---|---|
| 5,892,552 A | 4/1999 | Kim | |
| 6,337,621 B1 * | 1/2002 | Ogino | B60R 25/1004 307/10.2 |
| 6,678,728 B1 | 1/2004 | Uppunda et al. | |
| 7,986,635 B2 | 7/2011 | Kawamura | |

(Continued)

FOREIGN PATENT DOCUMENTS

| | | |
|---|---|---|
| CN | 1261242 A | 7/2000 |
| CN | 1574674 A | 2/2005 |

(Continued)

OTHER PUBLICATIONS

Specification of the Bluetooth System, Specification vol. 1, Core, Version 1.1, Feb. 22, 2001, 56 Pages.

*Primary Examiner* — Ricky Q Ngo
*Assistant Examiner* — Ellen A Kirillova

(57) ABSTRACT

There is provided a method of communicating information from a first node to a second node, the method comprising the first node transmitting a device name for the first node; the second node detecting the device name for the first node; and the second node determining the occurrence of an event at the first node and/or information from the first node from the detected device name for the first node.

15 Claims, 5 Drawing Sheets

(56) References Cited

U.S. PATENT DOCUMENTS

| | | | |
|---|---|---|---|
| 2004/0187006 A1 | 9/2004 | Trapp | |
| 2004/0257208 A1* | 12/2004 | Huang | B60R 25/102 340/426.1 |
| 2005/0267541 A1* | 12/2005 | Scheiner | A61N 1/36514 607/17 |
| 2006/0143645 A1* | 6/2006 | Vock | A43B 3/00 725/9 |
| 2008/0244556 A1* | 10/2008 | Plante | G06F 8/65 717/170 |
| 2011/0169612 A1 | 7/2011 | Alicot et al. | |
| 2011/0208532 A1 | 8/2011 | Rahman et al. | |
| 2012/0100868 A1 | 4/2012 | Kim et al. | |
| 2012/0270505 A1* | 10/2012 | Prakash | H04L 69/26 455/66.1 |
| 2012/0303459 A1* | 11/2012 | Stephens | H04W 8/005 705/14.64 |

FOREIGN PATENT DOCUMENTS

| | | | |
|---|---|---|---|
| CN | 101394201 A | 3/2009 | |
| CN | 101511066 A | 8/2009 | |
| CN | 102299729 A | 12/2011 | |
| JP | 2000052932 A | 2/2000 | |
| JP | 2013021435 A | 1/2013 | |
| JP | 2013197685 A | 9/2013 | |
| WO | 2012015356 A1 | 2/2012 | |
| WO | WO 2012015356 A1 * | 2/2012 | H04L 12/12 |

* cited by examiner

METHOD OF COMMUNICATING INFORMATION BETWEEN NODES

CROSS-REFERENCE TO PRIOR APPLICATIONS

This application is the U.S. National Phase application under 35 U.S.C. § 371 of International Application Serial. No. PCT/IB2013/054553, filed on Jun. 3, 2013, which claims the benefit of U.S. Application Ser. No. 61/662,950, filed on Jun. 22, 2012. These applications are hereby incorporated by reference herein.

TECHNICAL FIELD OF THE INVENTION

The invention relates to the communication of information from a first node to a second node, and in particular relates to the reliable communication of information using minimal power in the first node.

BACKGROUND TO THE INVENTION

Many communication protocols exist that provide bidirectional communication between two nodes (i.e. electronic devices) which, as part of the protocol, allow for discovery of nodes that are present on or connected to the communication medium. For example, protocols such as Bluetooth, WiFi and UPnP all allow a node to discover the identity and/or name of other active nodes (i.e. active in the sense that the nodes are broadcasting their name over the communication medium and/or are open to interrogation by and/or communication with, other nodes).

In general terms, communications in these protocols consist of two phases, and these phases are illustrated in FIG. 1. In a first phase 2, termed the 'device discovery phase', a node 4 wishing to initiate communications with another node 6, 8 queries the communication medium (i.e. over the air interface), which is represented by Query signals 10 in FIG. 1, to determine the nodes 6, 8 that are able to communicate with the initiating node 4.

Any node 6, 8 that is active (i.e. its transceiver circuitry is powered) and discoverable (i.e. open to establishing communications with another node) will reply to a received query signal 10 with its name (shown as "NameNode1" 12 and "NameNode2" 14 in FIG. 1) and numeric identifier.

Once the names and identifiers for nodes 6, 8 available for communication have been discovered, the initiating node 4 can establish a bidirectional communication channel 16 with the desired node (Node 1 in FIG. 1) in the second phase 18. The initiating node 4 and desired node 6 can then exchange data according to the communication protocol.

In these types of protocol, the first phase 2 is usually rigidly defined requiring a minimal amount of information to be exchanged between the nodes—typically only a text-based name for the node and a numerical identifier (such as a MAC address, which can be unique to the node). The rigid definition of this phase allows it to be very reliable and uniform (which allows every node implementing the protocol to understand and follow it. The second phase 18 often involves the freeform exchange of data (in some cases it is not limited by the length of data exchanged or its format). Because the second phase 18 is more loosely defined, communications between nodes are less reliable due to potential differences in the way in which the nodes individually implement the second phase 18 of the protocol.

For a range of types of electronic devices, it is necessary to provide a highly reliable communication channel to allow (sometimes only small amounts of) information to be conveyed to another device, while minimising the power consumed by such devices. Using a full two-phase communication protocol may introduce reliability problems due to the freeform nature of the second phase 18 of the protocol as described above, and may prolong the communication itself unnecessarily, which in turn might result in unnecessary power consumption.

Such devices include those used in a home healthcare and/or clinical healthcare settings. Many elderly people now carry or wear personal help buttons (PHBs) or personal emergency response systems (PERS) that they can activate if they need urgent assistance, such as when they fall. Automated fall detectors are available that monitor the movements of the user and automatically trigger an alarm if a fall is detected. Devices are also available that monitor the physiological characteristics of the user and to periodically or intermittently report the user's current status or an emergency condition.

These devices (i.e. PHBs, PERS, fall detectors and other monitoring devices) can initiate a phone call via a base unit located nearby to the user (i.e. typically in the user's home) to a dedicated call centre when they are activated, and the personnel in the call centre can talk to the user and arrange for assistance to be sent to the user in an emergency.

Thus, when an event is detected by the wearable device (for example the device detects a fall by the user, the user presses the help button or otherwise triggers the emergency response system), the device will need to communicate the occurrence of the event to the base unit through a wireless communication channel, so the base unit can initiate a call to a call centre or emergency services in order to get help to the user. In order to maximise the battery life of these devices (for example to allow the devices to used for weeks or months at a time without having to recharge or change the batteries, which is particularly desirable for elderly users), the wearable device does not actively communicate with the base unit until it becomes necessary (e.g. when the wearable device needs to convey the occurrence of an event or to inform the base unit of the current status of the wearable device). Thus, there may be no established communication channel between the wearable device and the base unit when an event occurs.

Therefore, there is a need for an improved method for reliably communicating information from a first node to a second node using minimal power in the first node.

SUMMARY OF THE INVENTION

According to a first aspect of the invention, there is provided a method of communicating information from a first node to a second node, the method in the second node comprising detecting a device name transmitted by the first node; and determining the occurrence of an event at the first node and/or information from the first node from the detected device name for the first node.

Preferably, the method is for communicating information from the first node to the second node during a node discovery phase of a communication protocol. This means that the information can be communicated from the first node to the second node reliably and quickly.

In some embodiments, the step of determining the occurrence of an event at the first node and/or information from the first node from the detected device name for the first node comprises determining the occurrence of the event at the first node and/or the information from the first node from the detection of the device name.

In these embodiments the step of determining the occurrence of the event at the first node and/or the information from the first node from the detection of the device name can comprise comparing the detected device name to one or more device names stored in a memory of the second node, each stored device name having a respective event and/or information from the first node associated therewith.

In alternative embodiments, the step of determining the occurrence of an event at the first node and/or information from the first node from the detected device name for the first node comprises processing the detected device name to extract the information concerning the occurrence of the event and/or information from the first node from part or all of the detected device name.

In these embodiments, the step of determining the occurrence of an event at the first node and/or information from the first node from the detected device name for the first node can comprise processing the detected device name to determine if the detected device name comprises a predetermined character string corresponding to the first node, and if so, processing the remaining part of the detected device name to extract the information concerning the occurrence of the event and/or information from the first node.

In preferred embodiments, the first and second nodes communicate according to the Bluetooth protocol and the device name for the first node detected by the second node is the Name, the WiFi protocol and the device name for the first node detected by the second node is the SSID, or the UPnP protocol and the device name for the first node detected by the second node is the Name.

The method in the first node preferably comprises transmitting a device name for the first node. Preferably, the method in the first node further comprises the step of activating a communication module in the first node such that the first node can respond to queries from the second node by transmitting the device name for the first node when information is to be communicated from the first node to the second node.

Preferably, the method in the first node further comprises deactivating a communication module in the first node after transmitting the device name for the first node.

In some embodiments, the method in the first node further comprises the step of amending or adapting the device name of the first node to include the information to be communicated in the device name or to correspond to a device name in a predefined set of possible device names for the first node that is associated with the information that is to be communicated; and wherein the step of transmitting a device name for the first node comprises transmitting the amended or adapted device name.

According to a second aspect of the invention, there is provided a method of communicating information from a first node to a second node, the method in the first node comprising adapting or amending a device name for the first node to include an indication of the occurrence of an event at the first and/or other information from the first node; and transmitting the adapted or amended device name for the first node.

Preferably, the method further comprises activating a communication module in the first node such that the first node can respond to queries from the second node by transmitting the adapted or amended device name for the first node when the information is to be communicated from the first node to the second node.

Preferably, the method in the first node further comprises deactivating a communication module in the first node after transmitting the adapted or amended device name for the first node.

According to a third aspect of the invention, there is provided an electronic device, comprising a communication module configured to receive a device name from another electronic device; and a control unit that is configured to determine the occurrence of an event at said another electronic device and/or information from said another electronic device from the detected device name for the another electronic device.

In some embodiments, the control unit is configured to determine the occurrence of an event at the another electronic device and/or information from the another electronic device from the detection of the device name for the another electronic device. In these embodiments, the control unit is preferably configured to determine the occurrence of the event at the first node and/or the information from the another electronic device from the detection of the device name by comparing the detected device name to one or more device names stored in a memory of the electronic device, each stored device name having a respective event and/or information from the another electronic device associated therewith.

Alternatively, the control unit is configured to determine the occurrence of an event at the another electronic device and/or information from the another electronic device from the detected device name for the another electronic device by processing the detected device name to extract the information concerning the occurrence of the event and/or information from the another electronic device from part or all of the detected device name.

In these embodiments, the control unit is configured to determine the occurrence of an event at the another electronic device and/or information from the another electronic device from the detected device name for the another electronic device by processing the detected device name to determine if the detected device name comprises a predetermined character string corresponding to the another electronic device, and if so, processing the remaining part of the detected device name to extract the information concerning the occurrence of the event and/or information from the another electronic device.

According to a fourth aspect of the invention, there is provided an electronic device, comprising a communication module configured to transmit a device name for the electronic device; wherein the electronic device is configured to adapt or amend the device name for the electronic device prior to transmission by the communication module to include an indication of the occurrence of an event at the electronic device and/or other information from the electronic device.

Preferably, the electronic device is configured such that, when information is to be communicated from the electronic device to another electronic device, the communication module in the electronic device is activated such that the electronic device can respond to queries from the another electronic device by transmitting the device name for the electronic device.

Preferably, the communication module is configured to be deactivated after transmitting the device name for the electronic device.

In some embodiments, the electronic device is configured to adapt or amend the device name for the electronic device prior to transmission to include the information to be communicated in the device name or to correspond to a device name in a predefined set of possible device names for the electronic device that is associated with the information that is to be communicated.

According to a fifth aspect of the invention, there is provided a communication system, comprising a first electronic device comprising a communication module configured to transmit a device to another electronic device; and a second electronic device comprising a communication module configured to receive a device name from the first electronic device; and a control unit that is configured to determine the occurrence of an event at the first electronic device and/or information from the first electronic device from the detected device name for the first electronic device.

In some embodiments, the first electronic device is configured to adapt or amend the device name for the first electronic device prior to transmission by the communication module to include an indication of the occurrence of an event at the first electronic device and/or other information from the first electronic device.

According to further aspects of the invention, there are provided computer program products comprising computer readable code embodied therein, the computer readable code being configured such that, on execution by a computer or processor having a communication module associated therewith, the computer or processor is configured to perform any of the methods described above.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE PREFERRED EMBODIMENTS

Figure 1:
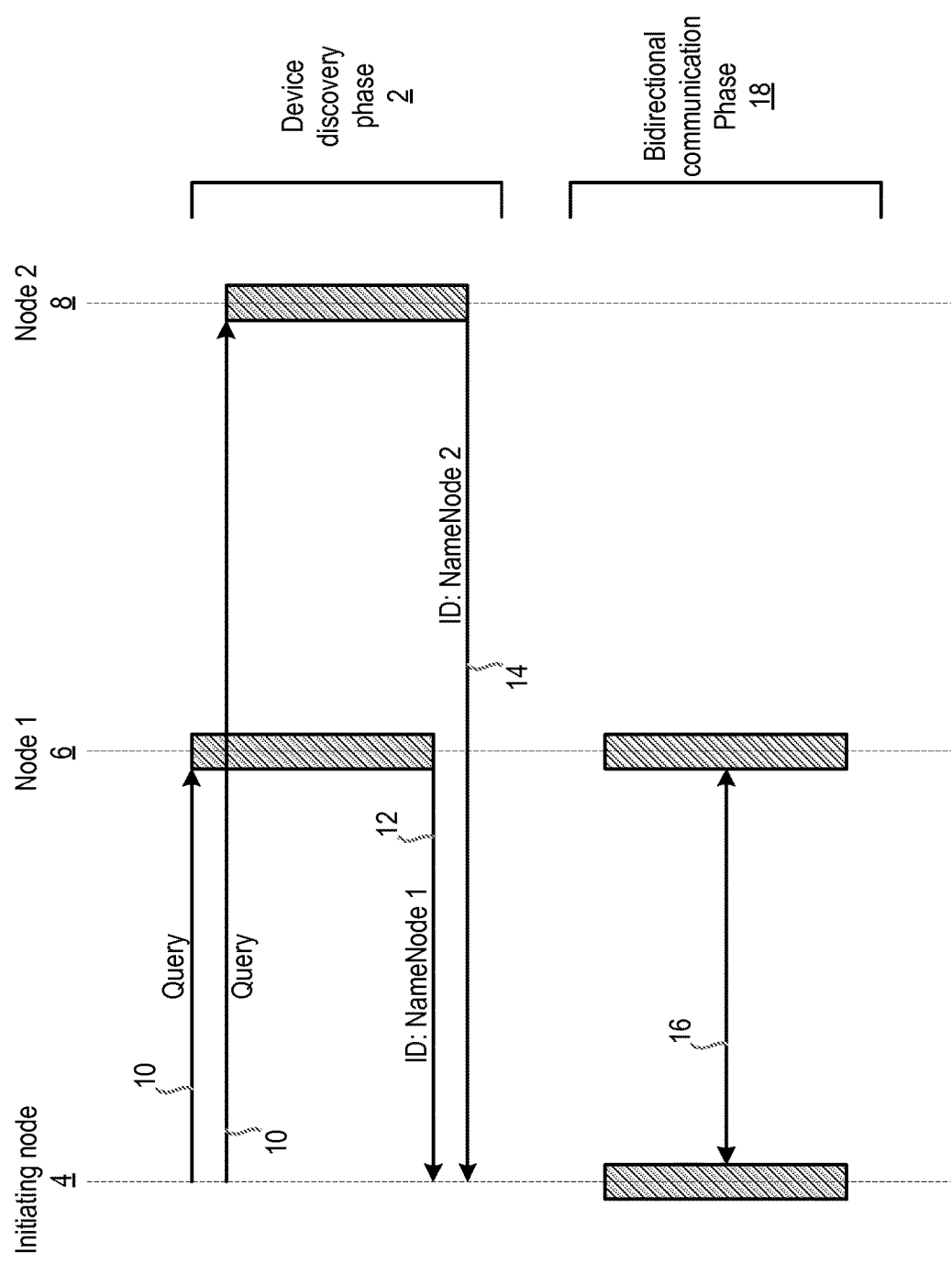
FIG. 1 is a diagram illustrating the two-phase nature of existing communication protocols.
Figure 2:
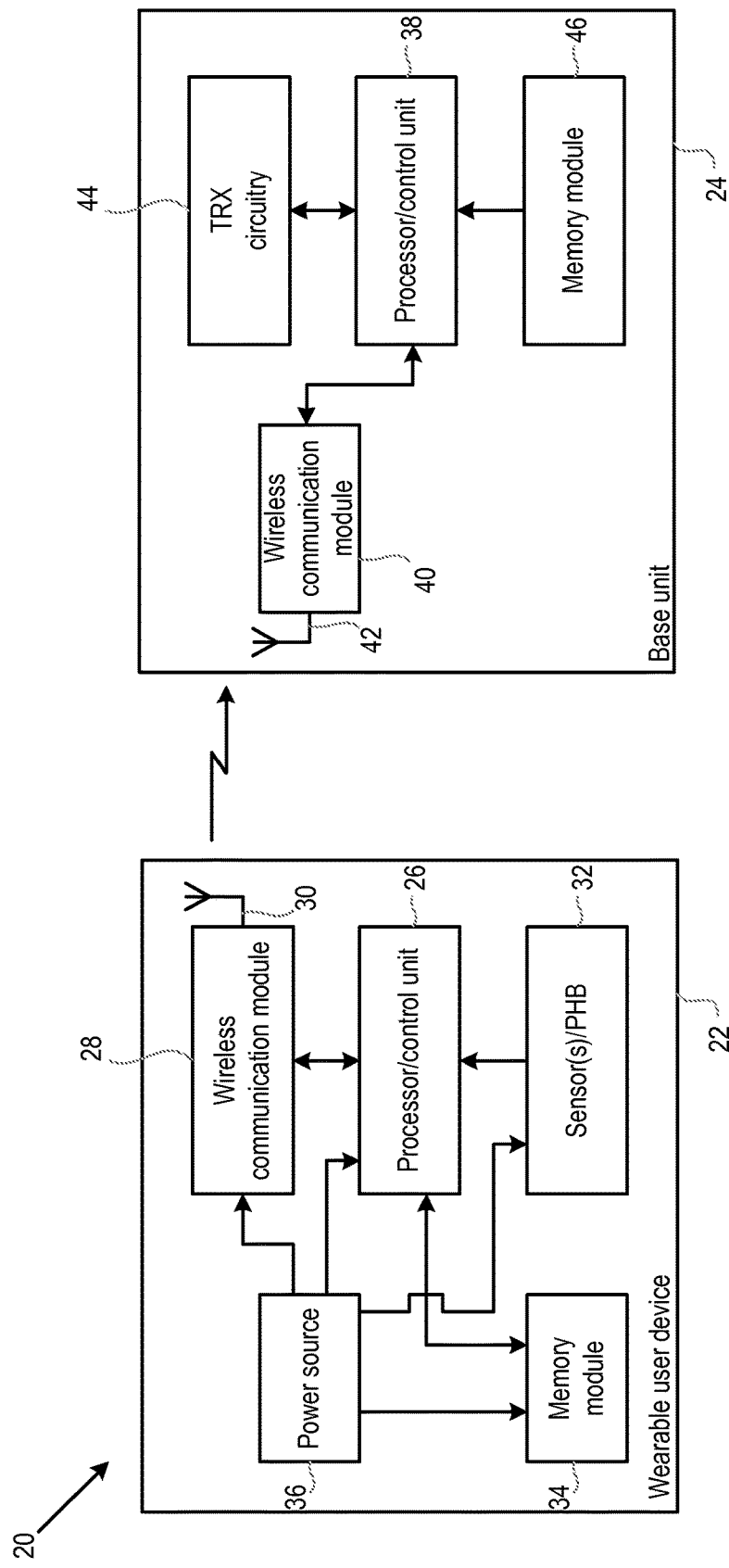
FIG. 2 is a block diagram illustrating a wearable device and a base unit in which the invention can be implemented.

An exemplary system 20 in which the invention can be implemented is shown in FIG. 2. The system 20 comprises a wearable user device 22 that is configured to be worn or carried by a user and a base unit 24 that is typically located in the home of the user.

The wearable user device 22 comprises a processor or control unit 26 that controls the general operation of the user device 22. In this illustrated embodiment, the user device 22 comprises a wireless communication module 28 with associated antenna 30, one or more sensors 32 and a memory module 34 that are each coupled to the processor or control unit 26. The user device 22 also comprises a power source 36 that supplies power to the various components 26, 28, 32, 34 of the user device 22.

The wireless communication module 28 and associated antenna 30 are used in accordance with the invention under control of the processor or control unit 26 to communicate information from the user device 22 to the base unit 24. It will be appreciated that the communication module 28 can be configured to communicate according to the Bluetooth protocol, the WiFi protocol(s), the UPnP protocols or any other suitable communication protocol that includes a phase in which device discovery takes place.

The nature of the one or more sensors 32 depends on the purpose of the wearable user device 22. For example, if the user device 22 is for detecting falls by the user, the one or more sensors 32 can comprise an accelerometer, magnetometer and/or gyroscope, and the processor or control unit 26 can process the signals from these sensors 32 to determine if the user has fallen. Alternatively, if the user device 22 is a personal help button or PERS device, the one or more sensors 32 can comprise the help button that can be manually activated by the user when assistance is required. In a further alternative, the user device 22 can be used to monitor one or more health parameters or physiological characteristics of the user, in which case the one or more sensors 32 can comprise, for example, a heart rate sensor, a blood pressure monitor, a thermometer, an electrocardiogram (ECG), a photoplethysmogram (PPG), etc. The processor or control unit 26 can process the signals from the one or more sensors 32 to determine the health status or physiological characteristics of the user.

The memory module 34 can store any data necessary for the functioning of the user device 22 (for example the measurements from the one or more sensors 32, the results of any processing of the measurements from the one or more sensors 32, program instructions for execution by the processor or control unit 26 to control the user device 22).

The base unit 24 comprises a respective processor or control unit 38 that controls the operation of the base unit 24. The base unit 24 further comprises a wireless communication module 40 and associated antenna 42 that is configured to be able to receive transmissions from the wireless communication module 28 in the user device 22. The wireless communication module 40 is connected to the processor or control unit 38.

As in this embodiment the base unit 24 is used to initiate a call to an external call centre or the emergency services, the base unit 24 is provided with transceiver circuitry 44 for initiating this call. The transceiver circuitry 44 may comprise circuitry for enabling communications over a public switched telephone network (PSTN) and/or a mobile telecommunications network.

The base unit 24 also comprises a memory module 46 for storing any data necessary for the functioning of the base unit 24.

Although the invention will be described further below with reference to communicating information from the wearable user device 22 to the base unit 24, it will be appreciated that the invention is not limited to this direction of communication, or to these types of devices. Those skilled in the art will appreciate that the invention can be used to communicate information from any electronic device to any other electronic device.

Figure 3:
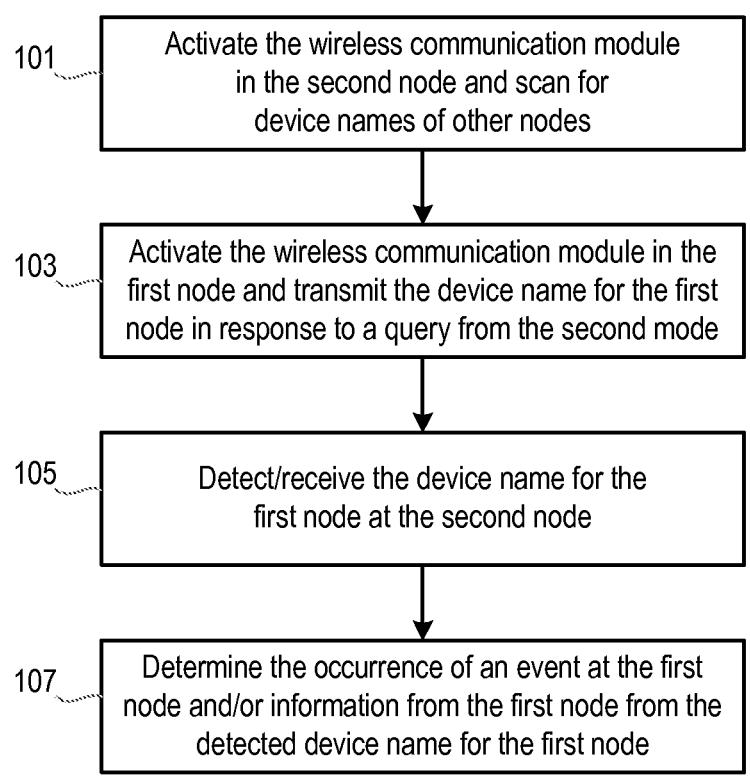
FIG. 3 is a flow chart illustrating a method of communicating information according to the invention.

The flow chart in FIG. 3 shows a general method of communicating information from the wearable user device 22 to the base unit 24 in accordance with the invention. In the figures and the following description, the wearable user device 22 is referred to as the first node 22, and the base unit 24 is referred to as the second node 24.

The information communicated from the first node 22 to the second node 24 according to the invention can comprise an indication that a predefined event has occurred at the first node 22 (for example the user of the first node 22 has fallen or pressed a personal help button 32, or the battery level is low) and/or information on the status of the first node 22 (for example a battery level, enabled device functionality, etc.) or on the user of the first node 22 (for example measurements or indications of the health status of the user obtained using the sensor(s) 32). Of course, it will be appreciated by those skilled in the art that other types of information can be communicated from the first node 22 to the second node 24 according to the invention.

In an initial step of the method, step 101, the processor or control unit 38 in the second node 24 activates or powers on the communication module 40. On being activated or powering up, the communication module 40 starts scanning the air interface for device names of other nodes that are available for communication. The module 40 can issue a query for other nodes periodically. The length of time between the transmission of each query can be set in the communication module 40, and is typically set to a few seconds, although it will be appreciated that the period between transmitting queries will not be less than the time taken for a single query to be completed (e.g. 11 seconds in Bluetooth).

Where the communication module 40 is a Bluetooth communication module 40, in the first phase, called 'Discovery', the module 40 scans the air interface for the device name (called 'Name' in the Bluetooth specifications), which can be the textual name of the node and the identifier for the node (the MAC address according to the Bluetooth specifications). The module 40 can also scan for the UUID (which indicates the type of node, for example, headset, serial port, telephone, computer, etc.) and the profile (which provides details for the indicated type, for example the audio codec used by a headset, etc.).

Where the communication module 40 is a WiFi communication module 40, in the first phase, called 'WiFi scan', the module 40 scans the air interface for the device name (called 'Service Set Identifier' or 'SSID' in the WiFi specifications), which can be the textual name of the node and the identifier for the node (the MAC address according to the Bluetooth specifications). The module 40 can also scan for or derive the radio channel being used from the scanning procedure, the supported data rate(s), the supported or required security or encryption level (for example WPA, WEP, etc.) and the network type (for example ad-hoc or infrastructure).

Where the communication module 40 is a UPnP communication module 40, in the first phase, called 'SSDP Discovery', the module 40 scans the air interface for the device name (called 'Name' in the UPnP specifications), which can be the textual name of the node and the identifier for the node (the IP address according to the UPnP specifications). The module 40 can also scan for the Device description, which can include the type of device (media server, QoS device, user interface control, etc.), a list of actions supported by the node (and list of arguments for each action) and a list of variables (both the actions and reading/writing variables belong to the second phase of the protocol).

When the first node 22 is required to communicate information to the second node 24 (for example when a predefined event has occurred at the first node 22, such as a fall, or when the first node 22 is to transmit status information), the processor or control unit 26 in the first node 22 activates or powers on the communication module 28 (step 103). On being activated or powered on, the communication module 28 will be able to respond to a query from the second node 24 by transmitting the device name for the first node 22 over the air interface.

In step 105, the communication module 40 in the second node 24 detects or receives the device name for the first node 22.

Then, in step 107, the second node 24 determines the communicated information (for example the occurrence of the predefined event or status information) from the detected device name for the first node 22. In particular, the second node 24 is configured to interpret or apply meaning to the received device name for the first node 22 to determine the communicated information.

In a first specific embodiment of the invention described in more detail with reference to FIG. 4 below, the second node 24 is configured to determine the communicated information just by virtue of the fact that the device name for the first node 22 has been detected on the communication medium (air interface). In this embodiment, which is typically used when the first node 22 has only one function or a single reason to communicate with the second node 24 (for example to communicate the occurrence of a fall event), the first node 22 can be configured only to activate or power on its communication module 28 when that event occurs, which means that the second node 24 can determine that the event has occurred just from discovering or detecting the device name for the first node 22 on the air interface.

In a second specific embodiment of the invention described in more detail with reference to FIG. 5 below, the second node 24 is configured to determine the communicated information from part or all of the detected device name. In this embodiment, which is typically used when a small amount of variable status information is to be communicated by the first node 22 (such as 'device OK' or the battery voltage), the first node 22 amends its device name prior to transmission to include the information in the device name or to correspond to a device name in a predefined set of possible device names for the first node 22 that is associated with the information that is to be communicated. The transmission of the device name by the first node 22 is thus effectively used as a one-way communication channel.

Thus, the second node 24 is able to determine the communicated information just through the detection of the device name for the first node 22. This means that the information can be communicated during the well-defined and reliable first phase of the communication protocol, without requiring the nodes 22, 24 to establish a bidirectional communication channel in accordance with the applicable communication protocol. This reduces the time taken for the first node 22 to communicate the information and also reduces the power consumed by the first node 22 when communicating the information.

Figure 4B:
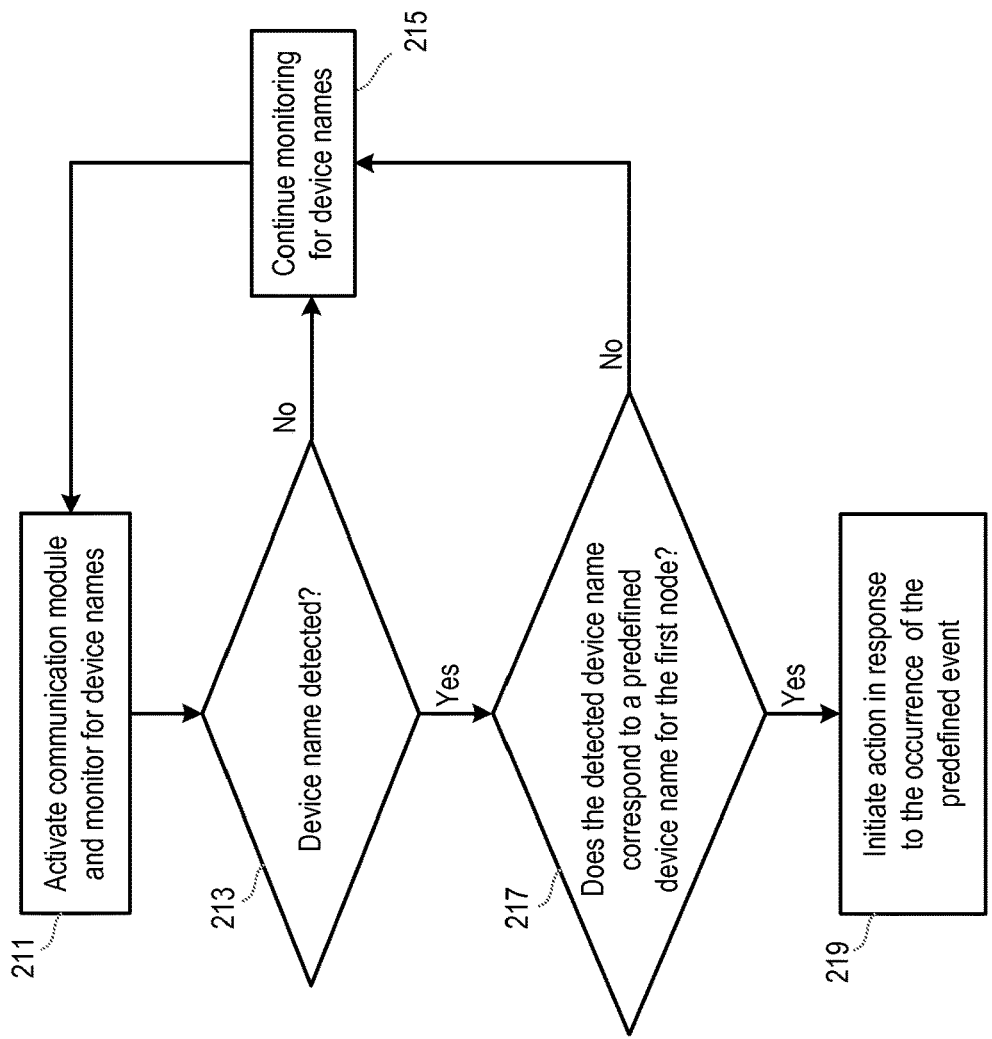
FIGS. 4a and 4b are flow charts illustrating a first specific embodiment of the invention in a first node and second node respectively.
Figure 4A:
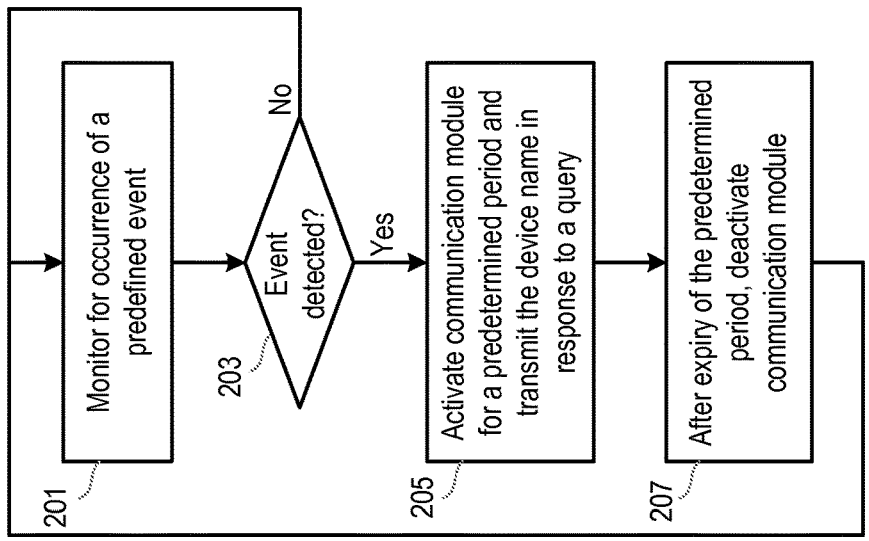

A first specific embodiment of the invention is shown in FIGS. 4a and 4b. FIG. 4a illustrates the method or process steps performed in the first node 22, and FIG. 4b illustrates the method or process steps performed in the second node 24. As indicated above, in this embodiment of the invention the first node 22 is configured to only broadcast its device name when the predefined information is to be communicated, and the second node 24 is configured to associate the detection of the device name for the first node 22 with that predefined information, and thus this embodiment is suited to use by first nodes 22 that only have one function or reason to communicate with the second node 24.

Thus, the first node 22 monitors for the occurrence of a predefined event (step 201), such as a fall by the user of the first node 22 or the pressing of a help button 32. Typically, this is done by analysing the signals received from the one or more sensors 32 in the first node 22.

At step 203, it is determined whether the predefined event has been detected. If not, the method in the first node returns to step 201. If the predefined event has been detected, then the method moves to step 205 in which the processor or control unit 26 in the first node 22 activates or powers on the communication module 28 so that the communication module 28 is able to respond to queries from the second (and other) nodes 24 by transmitting the device name for the first node 22.

The processor or control unit 26 powers the communication module 28 for a predetermined period, and on expiry of that period, the communication module is deactivated (step 207). In addition or alternatively, the processor or control unit 26 can be configured to deactivate the communication module 28 when the device name has been transmitted to the second node 24, which may occur before the expiry of the predetermined period. The method then returns to step 201.

The length of the predetermined period of time that the communication module 28 is powered or activated for (referred to as the discovery time) can be determined according to the protocol used by the communication module 28, and in particular according to the normal intervals between the issue of queries by the nodes (i.e. the communication module 28 should be active for at least the length of one interval between queries in order to ensure that a query will be received while the communication module 28 is powered or active.

The method in the second node 24 (as illustrated in FIG. 4b) starts in step 211 in which the communication module 40 is activated or powered on. The activation can occur, for example, when the second node 24 is first switched on, and, in the context of the invention, is assumed to occur long before the communication module 28 in the first node 22 is activated in step 205, which means that the communication module 40 in the second node 24 is active when step 205 occurs. Following activation of the communication module 40, the communication module 40 scans or monitors the air interface for device names of other nodes. In some cases, the communication module 40 can be configured to continuously scan for other nodes. Alternatively the module 40 can be configured to alternate between a scanning mode in which the module 40 scans for other nodes and an idle mode in the module 40 does not actively query the air interface. In this case, the length of each idle period will be set to less than the discovery time defined by the relevant communication protocol in order not miss any nodes.

In step 213, it is determined whether a device name has been detected. If not, the method moves to step 215 and the communication module 40 continues monitoring for device names.

If a device name has been detected, the detected device name is passed to the processor or control unit 38, and the processor or control unit 38 determines whether the device name corresponds to a device name for the first node (step 217). In some embodiments, the second node 24 can comprise a list of one or more device names corresponding to one or more nodes, along with an indication of the context in which that device name will be received. The information may also indicate an action that is to be taken by the second node 24 in the event that that device name is detected. The information could be stored in the memory module 46. For example, a device name for the first node 22 (for example 'Node1') can be stored, along with an indication that the detection of this device name means that a fall has been detected at the first node 22 and an emergency call should be initiated. Thus, in step 217, the processor or control unit 38 can examine the stored device names to determine if there is a match with the device name detected in step 213, and if so, the processor or control unit 38 determines that the specified event has occurred at the first node 22 (step 219), and initiates the required action (e.g. a call to the emergency services using transceiver circuitry 44).

If in step 217 the detected device name does not match a device name known to the second node 24, then the processor or control unit 38 can discard the detected device name and continue monitoring for device names (step 215).

Figure 5B:
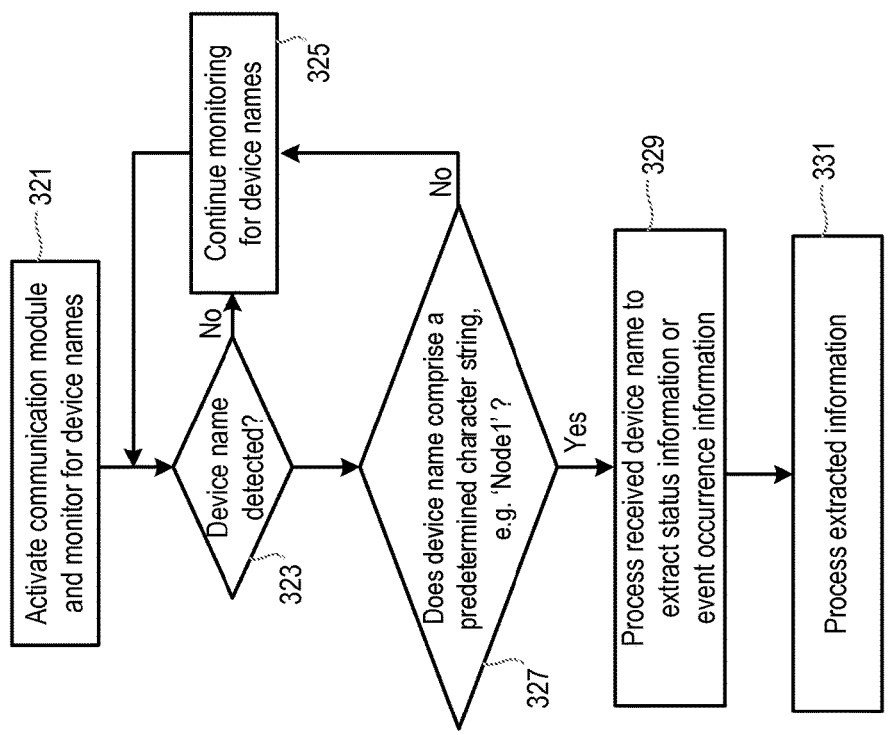
FIGS. 5a and 5b are flow charts illustrating a second specific embodiment of the invention in a first node and second node respectively.
Figure 5A:
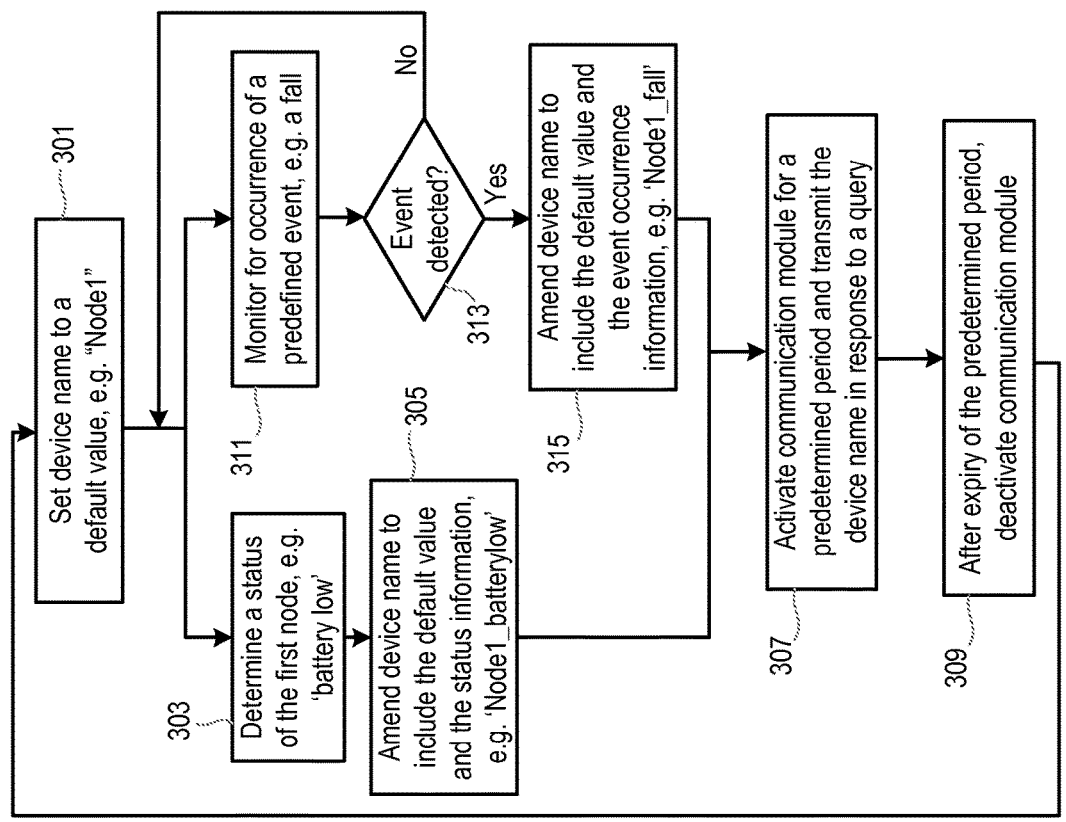

The second specific embodiment of the invention is shown in FIGS. 5a and 5b. FIG. 5a illustrates the method or process steps performed in the first node 22, and FIG. 5b illustrates the method or process steps performed in the second node 24. As indicated above, in this embodiment of the invention the first node 22 is configured to amend or adapt its device name prior to transmission to include the information to be communicated in the device name or to correspond to a device name in a predefined set of possible device names for the first node 22 that is associated with the information that is to be communicated. The second node 24 is configured to process the detected device name to extract or identify the communicated information.

In the first node 22, the processor or control unit 26 (or alternatively the communication module 28) in the first node 22 initialises the device name of the first node to a default value, such as 'Node1 ', or any other suitable text and/or numerical string (step 301). This device name can be stored in the memory module 34 of the first node 22 or alternatively in the communication module 28 itself. The default value for the device name will be known to the second node 24.

In step 303, when information is to be communicated to the second node 24, the processor or control unit 26 determines status information for the first node 22. The status information can comprise any information that is useful to communicate to another node 24, for example a battery status, general node functionality, etc. In some embodiments, the status can be determined from an output of one or more of the sensors 32. Step 303 can be performed regularly according to a schedule, or alternatively this step can be performed in response to a specified output from one or more of the sensors 32 (for example indicating a change in the battery or node status).

Then, in step 305, the device name for the first node 22 is adapted or amended to include the status information, or a representation of the status information. Preferably, the amended device name comprises the default value followed by the status information or representation of the status information, as this still allows the first node 22 to be identified from the device name. For example, if a sensor 32 indicates that the battery voltage is 3.2V and information concerning the battery status is to be communicated to the second node 24, the device name can be amended to 'Node1_battvoltage3.2' or 'Node1_battOK' (the 'battOK' part of the device name being a representation of the current status of 3.2V). Step 305 can be performed by the processor or control unit 26 or by the communication module 28. It will be appreciated that, provided the device name is permitted to be sufficiently large by the appropriate standard, multiple pieces of information can be communicated using the device name. For example, the first node 22 can report a general functioning status, a battery level and the heart rate of the user with a device name along the lines of 'Node1_OK_battvoltage3.2_70bpm'. It will be appreciated that the information does not have to be put into the device name in a user-readable format—it is alternatively possible to put the information into the device name in a computer-readable format, such as binary or hexadecimal (e.g. 'Node1_ADF07B310C').

The processor or control unit 26 in the first node 22 then activates or powers on the communication module 28 so that the communication module 28 is able to respond to queries from the second (and other) nodes 24 by transmitting the amended device name for the first node 22 (step 307).

The processor or control unit 26 powers the communication module 28 for a predetermined period, and on expiry of that period, the communication module is deactivated (step 309). As in the first embodiment described above, the processor or control unit 26 can alternatively be configured to deactivate the communication module 28 when the device name has been transmitted to the second node 24. The method then returns to step 301 and the device name is reset to the default value, e.g. 'Node1'.

As in the first embodiment above, the length of the predetermined period of time that the communication module 28 is powered or activated for (referred to as the discovery time) can be determined according to the protocol used by the communication module 28, and in particular according to the normal intervals between the issue of queries by the nodes.

In addition or alternatively to determining a status of the first node 22 in step 303, the processor or control unit 26 can monitor for the occurrence of a predefined event (step 311), such as a fall by the user of the first node 22 or the pressing of a help button 32. Typically, this is done by analysing the signals received from the one or more sensors 32 in the first node 22.

At step 313, it is determined whether the predefined event has been detected. If not, the method in the first node returns to step 311.

If a predefined event has been detected, then the device name for the first node 22 is amended to include an indication that the event has occurred (step 315). As in step 305, the amended device name preferably comprises the default value followed by the event indication, as this still allows the first node 22 to be identified from the device name. For example, if it is determined that the user of the first node 22 has fallen, the device name can be amended to 'Node1_fall'. As in step 305, step 315 can be performed by the processor or control unit 26 or by the communication module 28.

Once the device name has been amended, the method moves to step 307 and the communication module 28 is activated in order to enable transmission of the amended device name as above.

The method in the second node 24 (as illustrated in FIG. 5b) starts in step 321 in which the communication module 40 is activated or powered on. As in the first embodiment described above, the activation can occur, for example, when the second node 24 is first switched on, and, in the context of the invention, is assumed to occur long before the communication module 28 in the first node 22 is activated in step 307, which means that the communication module 40 in the second node 24 is active when step 307 occurs. Following activation of the communication module 40, the communication module 40 scans or monitors the air interface for device names of other nodes. In some cases, the communication module 40 can be configured to continuously scan for other nodes. Alternatively the module 40 can be configured to alternate between a scanning mode in which the module 40 scans for other nodes and an idle mode in the module 40 does not actively query the air interface. In this case, the length of each idle period will be set to less than the discovery time defined by the relevant communication protocol in order not miss any nodes.

In step 323, it is determined whether a device name has been detected. If not, the method moves to step 325 and the communication module 40 continues monitoring for device names.

If a device name has been detected, the detected device name is passed to the processor or control unit 38, and the processor or control unit 38 determines whether the device name comprises a predetermined character string corresponding to a known node, for example the first node (step 327). In some embodiments, the second node 24 can make use of a list of one or more default device names corresponding to one or more nodes from which information can be communicated in the first phase of a communication protocol. For example, a device name for the first node 22 (for example 'Node1') can be stored, and the second node 24 will scan detected device names for this character string.

If the detected device name includes a recognised character string/default device name, the method proceeds to step 329 in which the detected device name is processed to extract the status information or event occurrence information. Those skilled in the art will be aware of various ways in which this step can be implemented. For example, the processor or control unit 38 can work through the character string 'Node1_OK_battvoltage3.2_70bpm' and separate it into respective strings whenever it encounters the character "_". Then, when it has separate strings of characters, e.g. 'Node1', 'OK', 'battvoltage3.2' and '70bpm', the first string can be assumed or determined to be the device name, the second a status (e.g. OK or Error), third is the battery voltage (which means it has to discard the text 'battvoltage' and convert '3.2' into a number, etc. Where the device name includes the information in a more computer-friendly format (e.g. hexadecimal—'Node 1_ADF07B310C'), the predefined part of the device name (e.g. 'Node1') can be discarded and the hexadecimal part 'ADF07B310C', which is a hexadecimal representation of 5 binary bytes can be interpreted directly by the processor or control unit 38.

If in step 327 the detected device name does not include a recognised character string, (i.e. matching the default device name for a known node), then the processor or control unit 38 can discard the detected device name and continue monitoring for device names (step 325).

Thus, the second embodiment of the invention allows the first node 22 to communicate a variety of information to the second node 24 without having to establish a bidirectional communication channel with the second node 24.

As a modification to the described embodiments, It will be appreciated that rather than the first node 22 appending the information to be communicated to a default value for the device name, it is possible for the first node 22 to have a predetermined set of device names to select from when an event occurs or status information is to be recorded. In that case, the second node 24 will be programmed to associate a particular event or particular status to each of the possible device names, so that the communicated information can be determined when a device name is detected by the second node 24.

As a further alternative to the above embodiments, rather than powering on the communication module 28 when information is to be communicated, the communication module 28 of the first node 22 may be constantly powered, but the communication module 28 may be configured not to transmit its device name in response to device discovery queries from other nodes (i.e. the first node 22 can be in a 'hidden' mode). In that case, when information is to be communicated from the first node 22 to the second node 24, the processor or control unit 26 in the first node 22 can be configured to switch the communication module 28 into a 'visible' mode, which means that the communication module 28 will respond to queries from other nodes by transmitting the device name for the first node 22. However, it will be appreciated that these embodiments are less preferred since the communication module 28 will be powered for much longer than in the embodiments described above where the module 28 is only powered when information is to be transmitted.

There is therefore provided an improved way of reliably communicating information from a first node to a second node using minimal power in the first node.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of communicating information from a plurality of first nodes to a second node wherein each first node includes a wearable device including at least one of an accelerometer, a magnetometer, and a gyroscope configured to detect falls, and at least one processor and a transmitter and the second node is a base station including a transceiver, at least one processor, and a memory, the method comprising, during a discovery phase:
with the at least one first node processor of each of a plurality of wearable devices, adapting or amending a device name for each first node to include an indication of events at the first node, the events including at least a fall of a user wearing the wearable device;
with the base station, scanning an air interface to access each of the first nodes;
with each wearable device, transmitting the adapted or amended device name for each accessed wearable device corresponding to each of the events; with the base station, storing the adapted or amended device names corresponding to each event of each wearable device in the base station memory;

during a fall detection phase:
in response to one of the wearable devices detecting a fall, powering up the transmitter;
with the base station, periodically accessing wearable devices whose transmitter is powered up;
with the wearable device whose transmitter is powered up in response to being accessed by the base station, transmitting its adapted or amended name corresponding to a fall event;
with the base station, in response to receiving an adapted or amended device name, accessing the base station memory, determining whether the received adapted or amended name is indicative of a fall and in response to the adapted or determined device name is indicative of a fall, issuing a fall notification; and
powering down the transmitter of the wearable device until another event is detected.

2. An electronic device configured to communicate information, the electronic device comprising:
a wearable user device having at least one processor programmed to:
detect a device name transmitted by a base station during a node discovery phase; and
transmit an adapted or amended device name for the wearable user device adapted or amended to include an indication of the occurrence of the fall of a patient operably engaged with the wearable user device to the base station; and
a base station having at least one processor programmed to:
during a fall detection phase, periodically transmitting the device name;
determine the occurrence of a fall of the patient operably engaged with the wearable user device from a received adapted or amended device name; and
generating a fall alert;
wherein the wearable user device is further configured to detect a fall and in response to the detecting the fall, activate a transmitter of the user wearable device, and in response to receiving the device name from the base station, transmitting the adapted or amended device name.

3. The electronic device as claimed in claim 2, wherein the at least one processor of the base station is further programmed to:
determine the occurrence of the fall of the patient from the detection of the adapted or amended device name; and
transmit the device name to the associated call center.

4. The electronic device as claimed in claim 2, wherein the at least one processor of the base station is further programmed to:
compare the adapted or amended detected device name to one or more adapted or amended device names stored in a memory of the base station, each stored adapted or amended device name having a respective occurrence of at least one of a vent and information associated with the patient and detected by the wearable device; and
transmit the detected device name and the at least one event and at least a portion of information to the associated call center.

5. The electronic device as claimed in claim 2, wherein the at least one processor of the base station is further programmed to:
extract the information concerning the occurrence of the event and information from the wearable user device from part or all of the detected device name; and
transmit the detected device name and the extracted information to the associated call center.

6. The electronic device as claimed in claim 5, wherein the at least one processor of the base station is further programmed to:

determine when the detected device name comprises a predetermined character string corresponding to the wearable user device, and extract, from a remaining part of the detected device name, information concerning the occurrence of the fall of the patient from the wearable user device when the detected device name comprises a predetermined character string corresponding to the wearable user device; and transmit the detected device name and the extracted information to the associated call center.

7. The electronic device as claimed in claim 2, wherein the at least one processor of the wearable user device is further programmed to:

respond to queries from the base station by transmitting the adapted or amended device name for the wearable user device when information is to be communicated from the wearable user device to the base station.

8. The electronic device as claimed in claim 2, wherein during a fall detection phase:

in response to one of the wearable devices detecting a fall, powering up the transmitter;

with the base station, periodically accessing wearable devices whose transmitter is powered up;

with the wearable device whose transmitter is powered up in response to being accessed by the base station, transmitting its adapted or amended name corresponding to a fall event;

with the base station, in response to receiving an adapted or amended device name, accessing the base station memory, determining whether the received adapted or amended name is indicative of a fall and in response to the adapted or determined device name is indicative of a fall, issuing a fall notification; and powering down the transmitter of the wearable device until another event is detected.

9. A method for an electronic device configured to communicate information, the method, comprising:

detecting, with a processor of a wearable user device, a device name transmitted by a base station during a node discovery phase;

transmitting, with the processor of the wearable user device, an adapted or amended device name for the wearable user device adapted or amended to include an indication of the occurrence of the fall of a patient operably engaged with the wearable user device to the base station;

periodically transmitting, with a processor of a base station, the device name during a fall detection phase;

determining, with the processor of the base station, the occurrence of a fall of the patient operably engaged with the wearable user device from a received adapted or amended device name;

generating, with the processor of the base station, a fall alert;

detecting, with the processor of the wearable user device, a fall;

activating, with the processor of the wearable user device and in response to the detecting the fall, a transmitter of the user wearable device; and transmitting, with the processor of the wearable user device and in response to receiving the device name from the base station, the adapted or amended device name.

10. The method as claimed in claim 9, further comprising:

determining, with the processor of the base station, the occurrence of the fall of the patient from the detection of the adapted or amended device name; and transmitting, with the processor of the base station, the device name to the associated call center.

11. The method as claimed in claim 9, further comprising:

comparing, with the processor of the base station, the adapted or amended detected device name to one or more adapted or amended device names stored in a memory of the base station, each stored adapted or amended device name having a respective occurrence of at least one of a vent and information associated with the patient and detected by the wearable device; and transmitting, with the processor of the base station, the detected device name and the at least one event and at least a portion of information to the associated call center.

12. The method as claimed in claim 9 further comprising:

extracting, with the processor of the base station, the information concerning the occurrence of the event and information from the wearable user device from part or all of the detected device name; and transmitting, with the processor of the base station, the detected device name and the extracted information to the associated call center.

13. The method as claimed in claim 12, further comprising:

determining, with the processor of the base station, when the detected device name comprises a predetermined character string corresponding to the wearable user device;

extracting, with the processor of the base station, from a remaining part of the detected device name, information concerning the occurrence of the fall of the patient from the wearable user device when the detected device name comprises a predetermined character string corresponding to the wearable user device; and transmitting, with the processor of the base station, the detected device name and the extracted information to the associated call center.

14. The method as claimed in claim 9, further comprising:

responding, with the processor of the wearable user device, to queries from the base station by transmitting the adapted or amended device name for the wearable user device when information is to be communicated from the wearable user device to the base station.

15. The method as claimed in claim 9, further comprising, during the fall detection phase:

powering up the transmitter in response to one of the wearable devices detecting a fall;

periodically accessing wearable devices whose transmitter is powered up with the base station;

transmitting the adapted or amended name corresponding to a fall event with the wearable device whose transmitter is powered up in response to being accessed by the base station;

accessing the base station memory, determining whether the received adapted or amended name is indicative of a fall and in response to the adapted or determined device name is indicative of a fall, and issuing a fall notification with the base station in response to receiving an adapted or amended device name; and powering down the transmitter of the wearable device until another event is detected.

* * * * *